(12) United States Patent
Moon et al.

(10) Patent No.: US 9,034,524 B2
(45) Date of Patent: May 19, 2015

(54) SOLID ELECTROLYTE FOR RECHARGEABLE LITHIUM BATTERY AND RECHARGEABLE LITHIUM BATTERY INCLUDING SAME

(75) Inventors: Sung-Hwan Moon, Yongin-si (KR);
Jae-Hyuk Kim, Yongin-si (KR);
Hee-Young Chu, Yongin-si (KR);
Matulevich Yuri, Yongin-si (KR);
Myung-Hwan Jeong, Yongin-si (KR);
Chang-Ui Jeong, Yongin-si (KR);
Jong-Seo Choi, Yongin-si (KR);
Leonidovith Andreev Oleg,
Ekaterinburg (RU)

(73) Assignee: Samsung SDI Co., Ltd., Yongin-si (KR)

( * ) Notice: Subject to any disclaimer, the term of this patent is extended or adjusted under 35 U.S.C. 154(b) by 886 days.

(21) Appl. No.: 13/187,407

(22) Filed: Jul. 20, 2011

(65) Prior Publication Data

US 2012/0231349 A1 Sep. 13, 2012

(30) Foreign Application Priority Data

Mar. 7, 2011 (KR) ........................ 10-2011-0019937

(51) Int. Cl.
*H01M 10/0562* (2010.01)
*H01M 10/052* (2010.01)

(52) U.S. Cl.
CPC ............ *H01M 10/0562* (2013.01); *Y02E 60/12* (2013.01); *H01M 10/052* (2013.01); *H01M 2300/0068* (2013.01); *Y02E 60/122* (2013.01)

(58) Field of Classification Search
CPC .......... H01M 10/0562; H01M 10/052; H01M 2300/0068; Y02E 60/122; Y02E 60/12

USPC .......................................... 429/319, 322, 304
See application file for complete search history.

(56) References Cited

U.S. PATENT DOCUMENTS

| 5,677,081 | A | 10/1997 | Iwamoto et al. |
| 6,485,622 | B1 | 11/2002 | Fu |
| 2009/0317724 | A1 | 12/2009 | Kumar et al. |
| 2010/0086852 | A1 | 4/2010 | Gibot et al. |
| 2012/0094186 | A1 | 4/2012 | Chu et al. |

FOREIGN PATENT DOCUMENTS

| JP | 06-080462 A | 3/1994 |
| JP | 08-148180 A | 6/1996 |
| JP | 2000-340255 | * 12/2000 |
| JP | 2010-3694 A | 1/2010 |
| JP | 2010-192258 A | 9/2010 |
| KR | 10-0449142 | 9/2004 |
| KR | 10-2009-0129460 | 12/2009 |
| KR | 10-2012-0039447 A | 4/2012 |

OTHER PUBLICATIONS

Korean Notice of Allowance dated Jul. 24, 2012 issued to Korean Priority Patent Application KR-2011-0019937, 5 pages.
Patent Abstract of Japan and English translation of Japanese JP2010-192258A listed above, 15 pages.
Korean Patent Abstracts for Publication No. KR10-2003-0043176 corresponding to KR10-0449142.

* cited by examiner

*Primary Examiner* — Laura Weiner
(74) *Attorney, Agent, or Firm* — Christie, Parker & Hale, LLP (57) ABSTRACT

A solid electrolyte for a rechargeable lithium battery includes a compound represented by $Li_{1+x}Ti_{2-x}Al_xM_y(PO_4)_{3-y}$, and a glass-based oxide selected from $LiPO_3$, $Li_2O$—$B_2O_3$, and combinations thereof. A rechargeable lithium battery includes the solid electrolyte.

12 Claims, 5 Drawing Sheets

SOLID ELECTROLYTE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2011-0019937 filed in the Korean Intellectual Property Office on Mar. 7, 2011, the entire contents of which are incorporated herein by reference.

BACKGROUND

1. Field

The invention relates to solid electrolytes for rechargeable lithium batteries and rechargeable lithium batteries including the same.

2. Description of Related Art

Rechargeable lithium batteries have recently been spotlighted as energy sources for small, portable electronic devices. A rechargeable lithium battery includes a positive electrode, a negative electrode, and an electrolyte.

As the positive active material of a rechargeable lithium battery, lithium-transition element composite oxides capable of intercalating lithium (such as $LiCoO_2$, $LiMn_2O_4$, $LiNi_{1-x}Co_xO_2$ ($0<x<1$)) have been researched.

As the negative active material of a rechargeable lithium battery, various carbon-based materials such as artificial graphite, natural graphite, and hard carbon have been used, all of which can intercalate and deintercalate lithium ions.

As for the electrolyte, batteries using organic electrolyte solutions provide discharge voltages that are more than twice as high as those of batteries using alkali aqueous solutions. As a result, batteries using organic electrolyte solutions have high energy density. Thus, organic electrolyte solutions are more widely used.

However, it is dangerous to use organic electrolyte solutions because the electrolyte solution may leak and cause explosion and/or ignition at high temperatures. Some attempts to solve this problem have included the development of a flame-retardant electrolyte or the use of an ionic liquid for an electrolyte.

Another attempt to solve the problem resulting from the use of organic electrolyte solutions has been the development of a solid battery, that is, a battery using a solid electrolyte instead of a liquid electrolyte solution.

Solid electrolytes may largely be divided into ceramic-based solid electrolytes and polymer-based solid electrolytes, and the ceramic-based solid electrolytes are divided again into oxide-based solid electrolytes and sulfide-based solid electrolytes.

SUMMARY

In an exemplary embodiment, a solid electrolyte for a rechargeable lithium battery has good ion conductivity.

In another embodiment, a rechargeable lithium battery includes the solid electrolyte.

According to some embodiments, a solid electrolyte for a rechargeable lithium battery includes a compound represented by the following Chemical Formula 1, and a glass-based oxide selected from $LiPO_3$, $Li_2O$—$B_2O_3$, and combinations thereof.

$$Li_{1+x}Ti_{2-x}Al_xM_y(PO_4)_{3-y}$$  Chemical Formula 1

In Chemical Formula 1, x is in the range of 0 to 1, M is Si or Ge, and y is in the range of 0 or 1.

In the solid electrolyte, the compound represented by Chemical Formula 1 and the glass-based oxide may exist in the form of a solid solution in which the glass-based oxide is a solid dissolved in the compound represented by Chemical Formula 1. Also, the solid electrolyte may further include a glass-based oxide selected from $LiPO_3$, $Li_2O$—$B_2O_3$, and combinations thereof, in addition to the solid solution.

In some embodiments, the amount of the glass-based oxide may range from about 1 wt % to about 20 wt %. In some embodiments, for example, the amount of the glass-based oxide may range from about 1 wt % to about 5 wt %.

In the glass-based oxide, the weight ratio of $Li_2O$ to $B_2O_3$ in the $Li_2O$—$B_2O_3$ may range from about 1:9 to about 9:1.

The glass-based oxide may be amorphous.

According to another embodiment, a rechargeable lithium battery includes a negative electrode including a negative active material, a positive electrode including a positive active material, and a non-aqueous electrolyte.

Since a solid electrolyte according embodiments of this disclosure shows good ion conductivity, it may provide a rechargeable lithium battery having good battery characteristics.

DETAILED DESCRIPTION OF THE EMBODIMENTS

Exemplary embodiments will hereinafter be described in detail. However, these embodiments are exemplary, and this disclosure is not limited thereto.

In some embodiments, a solid electrolyte for a rechargeable lithium battery includes a compound represented by the following Chemical Formula 1, and a glass-based oxide which is $LiPO_3$, $Li_2O$—$B_2O_3$, or a combination thereof.

$$Li_{1+x}Ti_{2-x}Al_xM_y(PO_4)_{3-y}$$  Chemical Formula 1

In Chemical Formula 1, x is in the range of 0 or 1, M is Si or Ge, and y is in the range of 0 or 1.

In the solid electrolyte according to embodiments of this disclosure, the compound represented by the above Chemical Formula 1 and the glass-based oxide may exist in the form of a solid solution in which the glass-based oxide is a solid dissolved in the compound represented by the above Chemical Formula 1. Also, the solid electrolyte may further include a glass-based oxide selected from $LiPO_3$, $Li_2O$—$B_2O_3$, and combinations thereof, in addition to the solid solution.

The solid electrolyte includes $LiPO_3$, $Li_2O$—$B_2O_3$, or a combination thereof as a glass-based oxide. The glass-based oxide conducts ions, does not conduct electrons, and has good chemical stability. If $V_2O_5$ were used as the glass-based oxide, $V_2O_5$ has semiconductor properties and conducts electrons. Therefore, it is not proper for a solid electrolyte. In addition, since $GeO_2$ is expensive and has low chemical stability, it is not economical to use $GeO_2$. Also, since $B_2O_3$ has a flat 6-numbered ring structure formed of boron and oxygen, its structure is more open than the open tetrahedron structure of quartz glass, and it is favorable for ion conductivity.

In the solid electrolyte according to embodiments of this disclosure, the glass-based oxide may be included in an amount of about 1 wt % to about 20 wt % based on the total weight of the solid electrolyte. According to other embodiments, the glass-based oxide may be included in an amount of about 1 wt % to about 5 wt %. The amount of the glass-based oxide means the amount included in the solid solution. Alternatively, when the glass-based oxide exists both independently and in addition to the solid solution, the amount of the glass-based oxide means the total amount of glass-based oxide existing both independently and in the solid solution (that is, the total amount of the glass-based oxide existing in the electrolyte). When the amount of the glass-based oxide falls in these ranges, the ion conductivity of the solid electrolyte may be improved without any substantial adverse effect.

In the glass-based oxide, the weight ratio of $Li_2O$ to $B_2O_3$ in the $Li_2O$—$B_2O_3$ material may range from about 1:9 to about 9:1. When the weight ratio falls in this range, proper ion conductivity characteristics according to the mixed use of $Li_2O$ and $B_2O_3$ may be obtained.

The glass-based oxide may be amorphous, and amorphous glass-based oxides are favorable in terms of ion conductivity, as compared with crystalline glass-based oxides.

The solid electrolyte according to embodiments of this disclosure may have an ion conductivity ranging from about $1*10^{-5}$ S/cm to about $8*10^{-4}$ S/cm. When the ion conductivity of the solid electrolyte falls in the range, it is appropriate.

The solid electrolyte according to embodiments of this disclosure may be prepared through the following process. First, a compound represented by the following Chemical Formula 1 is mixed with a glass-based oxide selected from $LiPO_3$, $Li_2O$—$B_2O_3$, and combinations thereof. The mixing ratio of the compound represented by the following Chemical Formula 1 and the glass-based oxide may range from about 99:1 wt % to about 80:20 wt %. According to another embodiment, the mixing ratio may range from about 99:1 wt % to about 95:5 wt %.

A solid electrolyte is prepared by heat treating the mixture. When the amount of the glass-based oxide ranges from about 1 wt % to about 5 wt %, a solid solution of the compound represented by the Chemical Formula 1 and the glass-based oxide is formed. When the glass-based oxide is used in an amount that exceeds about 5 wt %, and is less than or equal to about 20 wt %, the glass-based oxide may exist independently as well as in the solid solution.

The heat treatment process may be performed at about 600° C. to about 1000° C. for about 1 hour to about 15 hours. When the heat treatment process is performed at a temperature within this range and for a period of time within this range, a uniform composite body may be formed.

According to other embodiments, a rechargeable lithium battery includes a negative electrode including a negative active material, a positive electrode including a positive active material, and a solid electrolyte. The solid electrolyte is disposed between the negative electrode and the positive electrode, and the structure and composition of the solid electrolyte is as described above. In the rechargeable lithium battery according to embodiments of this disclosure, the solid electrolyte has a thickness of about 5 μm to about 50 μm. When the thickness of the solid electrolyte falls in this range, ions may be transferred rapidly without a short-circuit problem.

Since the solid electrolyte according to embodiments of this disclosure is disposed between the negative electrode and the positive electrode, the solid electrolyte may function as a separator as well. Therefore, the battery does not have to use an additional separator.

In some embodiments of this disclosure, the negative electrode includes a current collector and a negative active material layer disposed on the current collector.

The negative active material includes a material that reversibly intercalates/deintercalates lithium ions, lithium metal, a lithium metal alloy, a material capable of doping/dedoping lithium, or a transition metal oxide.

The material that may reversibly intercalates/deintercalates lithium ions may include a carbon material. The carbon material may be any carbon-based negative active material generally used in lithium ion rechargeable batteries. Nonlimiting examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, or the like.

Nonlimiting examples of the lithium metal alloy include alloys of lithium and a metal selected from Na, K, Rb, Cs, Fr, Be, Mg, Ca, Sr, Si, Sb, Pb, In, Zn, Ba, Ra, Ge, Al, and Sn.

Nonlimiting examples of the material capable of doping/dedoping lithium include Si, SiO, (where 0<x<2), Si-Q alloys (where Q is selected from alkali metals, alkali-earth metals, group 13 elements, group 14 elements, group 15 elements, group 16 elements, transition elements, rare earth elements, and combinations thereof, but Q is not Si), Sn, $SnO_2$, Sn—R alloys (where R is selected from alkali metals, alkali-earth metals, group 13 elements, group 14 elements, group 15 elements, group 16 elements, transition elements, rare earth elements, and combinations thereof, but R is not Sn), and mixtures thereof. At least one of these materials may be mixed with $SiO_2$. The elements Q and R may be independently selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

In some embodiments, the transition metal oxide may include vanadium oxide, lithium vanadium oxide or lithium titanium oxide.

The negative active material layer may include about 95 wt % to about 99 wt % of the negative active material based on the total weight of the negative active material layer.

The negative active material layer may include a negative active material, a binder, and optionally a conductive material. The negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves the binding properties of the negative active material particles to one another and to the current collector. The binder may include a non-water-soluble binder, a water-soluble binder, or a combination thereof.

Nonlimiting examples of the non-water-soluble binder include polyvinylchloride, carboxylated polyvinylchloride, polyvinylfluoride, polymers including ethylene oxide, polyvinylpyrrolidone, polyurethane, polytetrafluoroethylene, polyvinylidene fluoride, polyethylene, polypropylene, polyamideimide, polyimide, and combinations thereof.

Nonlimiting examples of the water-soluble binder include styrene-butadiene rubbers, acrylated styrene-butadiene rubbers, polyvinyl alcohol, sodium polyacrylate, copolymers of propylene and a C2 to C8 olefin, copolymers of (meth)acrylic acid and (meth)acrylic acid alkyl ester, and combinations thereof.

When the water-soluble binder is used as the negative electrode binder, a cellulose-based compound may be further used to provide viscosity. The cellulose-based compound may include one or more of carboxymethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material.

The conductive material is included to improve electrode conductivity. Any electrically conductive material may be used as a conductive material so long as it does not cause a chemical change. Nonlimiting examples of the conductive material include carbon-based materials such as natural graphite, artificial graphite, carbon black, acetylene black, ketjen black, carbon fibers, and the like; metal-based materials such as metal powders or metal fibers including copper, nickel, aluminum, silver, and the like; conductive polymers such as polyphenylene derivatives; and mixtures thereof.

The current collector may include a copper foil, a nickel foil, a stainless steel foil, a titanium foil, a nickel foam, a copper foam, a polymer substrate coated with a conductive metal, or a combination thereof.

The positive electrode includes a current collector and a positive active material layer disposed on the current collector. The positive active material includes lithiated intercalation compounds that reversibly intercalate and deintercalate lithium ions. The positive active material may include a composite oxide of lithium and at least one selected from cobalt, manganese, and nickel. In particular, the following compounds may be used:

$Li_aA_{1-b}X_bD_2 (0.90 \leq a \leq 1.8, 0 \leq b \leq 0.5)$
$Li_aE_{1-b}X_bO_{2-c}D_c (0.90 \leq a \leq 1.8, 0 \leq b \leq 0.5, 0 \leq c \leq 0.05)$
$Li_aE_{2-b}X_bO_{4-c}D_c (0.90 \leq a \leq 1.8, 0 \leq b \leq 0.5, 0 \leq c \leq 0.05)$
$Li_aNi_{1-b-c}Co_bX_cD_\alpha (0.90 \leq a \leq 1.8, 0 \leq b \leq 0.5, 0 \leq c \leq 0.05, 0 \leq \alpha \leq 2)$
$Li_aNi_{1-b-c}Co_bX_cO_{2-\alpha}T_\alpha (0.90 \leq a \leq 1.8, 0 \leq b \leq 0.5, 0 \leq c \leq 0.05, 0 \leq \alpha < 2)$
$Li_aNi_{1-b-c}Co_bX_cO_{2-\alpha}T_2 (0.90 \leq a \leq 1.8, 0 \leq b \leq 0.5, 0 \leq c \leq 0.05, 0 \leq \alpha < 2)$
$Li_aNi_{1-b-c}Mn_bX_cD_\alpha (0.90 \leq a \leq 1.8, 0 \leq b \leq 0.5, 0 \leq c \leq 0.05, 0 \leq \alpha \leq 2)$
$Li_aNi_{1-b-c}Mn_bX_cO_{2-\alpha}T_\alpha (0.90 \leq a \leq 1.8, 0 \leq b \leq 0.5, 0 \leq c \leq 0.05, 0 \leq \alpha < 2)$
$Li_aNi_{1-b-c}Mn_bX_cO_{2-\alpha}T_2 (0.90 \leq a \leq 1.8, 0 \leq b \leq 0.5, 0 \leq c \leq 0.05, 0 \leq \alpha < 2)$
$Li_aNi_bE_cG_dO_2 (0.90 \leq a \leq 1.8, 0 \leq b \leq 0.9, 0 \leq c \leq 0.5, 0.001 \leq d \leq 0.1)$
$Li_aNi_bCo_cMn_dG_eO_2 (0.90 \leq a \leq 1.8, 0 \leq b \leq 0.9, 0 \leq c \leq 0.5, 0 \leq d \leq 0.5, 0.001 \leq e \leq 0.1)$
$Li_aNiG_bO_2 (0.90 \leq a \leq 1.8, 0.001 \leq b \leq 0.1)$
$Li_aCoG_bO_2 (0.90 \leq a \leq 1.8, 0.001 \leq b \leq 0.1)$
$Li_aMnG_bO_2 (0.90 \leq a \leq 1.8, 0.001 \leq b \leq 0.1)$
$Li_aMn_2G_bO_4 (0.90 \leq a \leq 1.8, 0.001 \leq b \leq 0.1)$
$QO_2$
$QS_2$
$LiQS_2$
$V_2O_5$
$LiV_2O_5$
$LiZO_2$
$LiNiVO_4$
$Li_{(3-f)}J_2(PO_4)_3 (0 \leq f \leq 2)$
$Li_{(3-f)}Fe_2(PO_4)_3 (0 \leq f \leq 2)$
$Li_aFePO_4 (0.90 \leq a \leq 1.8)$ In the above formulas, A is selected from Ni, Co, Mn, and combinations thereof. X is selected from Al, Ni, Co, Mn, Cr, Fe, Mg, Sr, V, rare earth elements, and combinations thereof. D is selected from O, F, S, P, and combinations thereof. E is selected from Co, Mn, and combinations thereof. T is selected from F, S, P, and combinations thereof. G is selected from Al, Cr, Mn, Fe, Mg, La, Ce, Sr, V, and combinations thereof. Q is selected from Ti, Mo, Mn, and combinations thereof. Z is selected from Cr, V, Fe, Sc, Y, and combinations thereof. J is selected from V, Cr, Mn, Co, Ni, Cu, and combinations thereof.

The compound may have a coating layer on the surface, or may be mixed with another compound having a coating layer. The coating layer may include at least one coating element compound selected from oxides of the coating element, hydroxides of the coating element, oxyhydroxides of the coating element, oxycarbonates of the coating element, and hydroxycarbonates of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any method having no substantial adverse influence on the properties of the positive active material by including the elements in the compound. For example, the method may include any coating method such as spray coating, dipping, and the like, which are known to those of skill in the field.

In the positive active material layer, the positive active material may be included in an amount of about 90 wt % to about 98 wt % based on the total weight of the positive active material layer.

The positive active material layer may further include a binder and a conductive material. The binder and the conductive material may each be included in an amount of about 1 wt % to about 5 wt %, based on the total weight of the positive active material layer.

The binder improves the binding properties of the positive active material particles to each other and to the current collector. Nonlimiting examples of the binder include polyvinylalcohol, carboxymethylcellulose, hydroxypropylcellulose, diacetylcellulose, polyvinylchloride, carboxylated polyvinylchloride, polyvinyifluoride, polymers including ethylene oxide, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material improves the electrical conductivity of the positive electrode. Any electrically conductive material can be used as the conductive agent so long as it does not cause a chemical change. Nonlimiting examples of the conductive material include carbon-based materials such as natural graphite, artificial graphite, carbon black, acetylene black, ketjen black, carbon fibers, and the like; metal-based materials such as metal powders or metal fibers made of copper, nickel, aluminum, silver, and the like; conductive polymers such as polyphenylene derivatives, and the like; and mixtures thereof.

The current collector may be Al foil but is not limited thereto.

The negative electrode and positive electrode may be fabricated by a method including mixing the active material, conductive material, and binder in a solvent to prepare an active material composition, and coating the composition on a current collector. The electrode manufacturing method is known to those of ordinary skill in the field. The solvent may include N-methylpyrrolidone or the like, but is not limited thereto.

Figure 1:
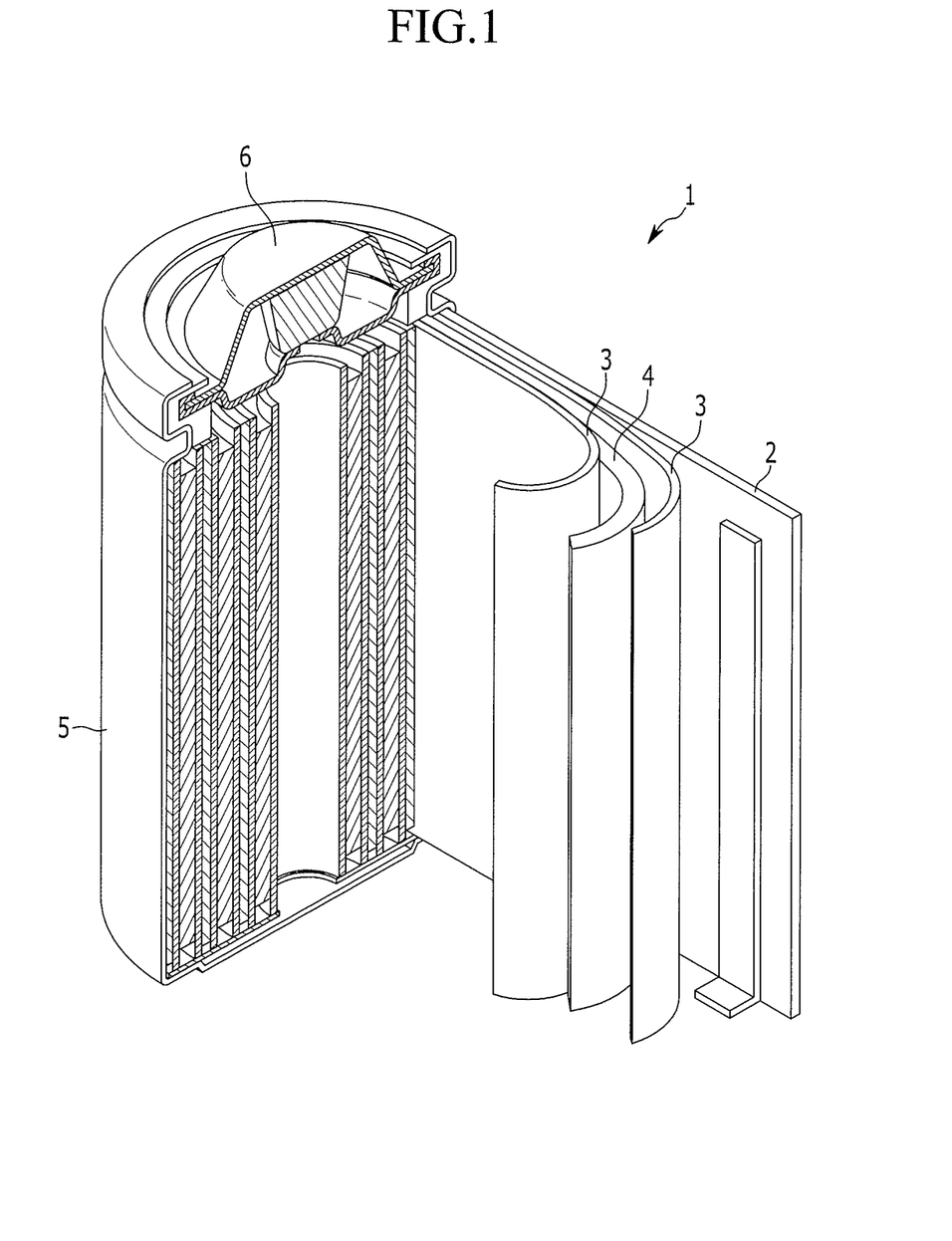
FIG. 1 is a schematic cross-sectional view of a rechargeable lithium battery according to one embodiment.

FIG. 1 is a schematic cross-sectional view of a rechargeable lithium battery according to some embodiments. As shown in FIG. 1, the rechargeable lithium battery 1 includes a battery case 5 including a positive electrode 4, a negative electrode 2, a solid electrolyte 3 disposed between the positive electrode 4 and the negative electrode 2, and a sealing member 6 sealing the battery case 5.

The following examples are presented for illustrative purposes only, and do not limit the scope of this disclosure.

Comparative Example 1

$Li_2CO_3$, $TiO_2$, $Al_2O_3$, and $NH_{42}HPO_4$ were weighed stoichiometrically and mixed. The mixture was sintered at about 920° C. for about 8 hours to thereby prepare a $Li_{1.3}Ti_{1.7}Al_{0.3}(PO_4)_3$ solid electrolyte.

Figure 2:
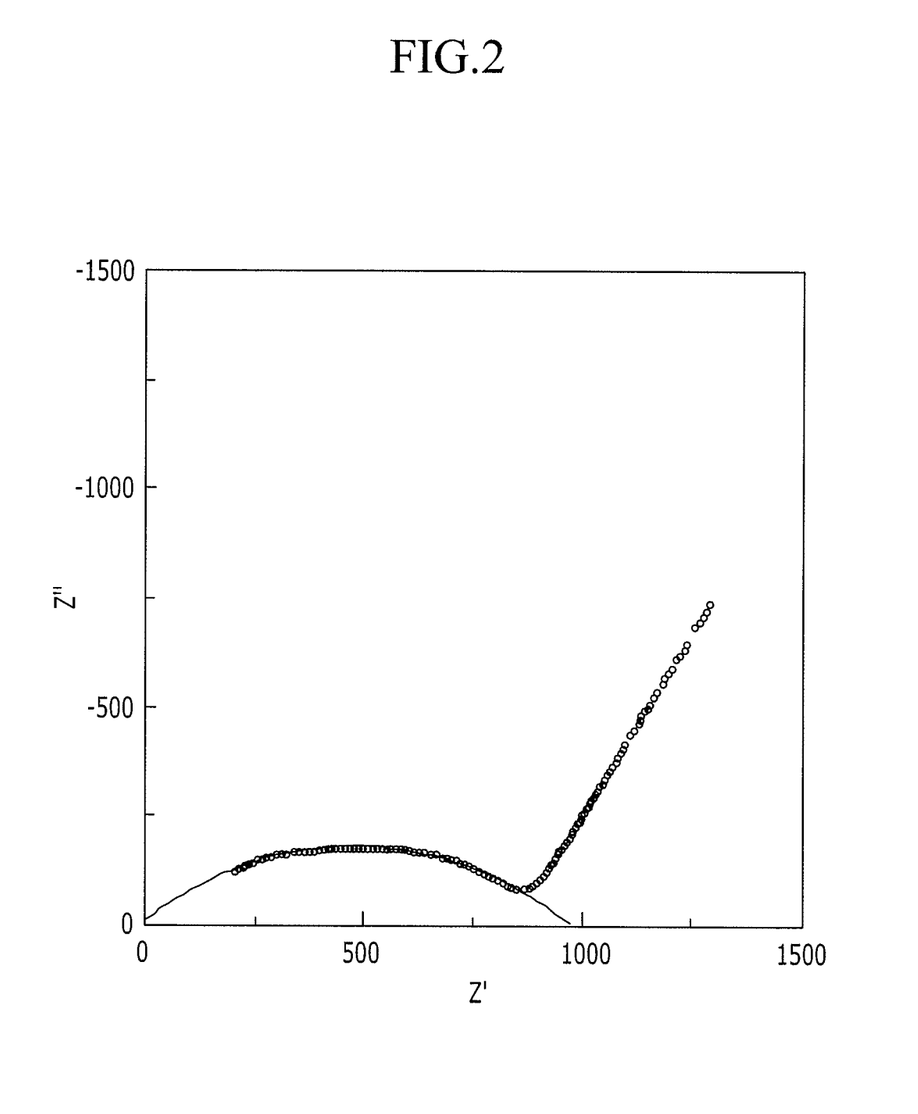
FIG. 2 is a graph of the ion conductivity evaluation results of the solid electrolyte prepared according to Comparative Example 1.

The results of measuring the ion conductivity of the prepared $Li_{1.3}Ti_{1.7}Al_{0.3}(PO_4)_3$ electrolyte are shown in FIG. 2. In FIG. 2, the line represented by ○ is the actually measured ion conductivity data, and the hemisphere represented by a solid line was obtained by fitting the actual data. The point where the right-most part of the hemisphere shown in FIG. 2 meets the X-axis (real resistance) is the total resistance of $Li_{1.3}Ti_{1.7}Al_{0.3}(PO_4)_3$, and the ion conductivity was calculated based on the following Equation 1.

$$\sigma = l/(R_{estimated}S) \quad \text{Equation 1}$$

In Equation 1, σ denotes ion conductivity, l denotes the length of the measured sample ($Li_{1.3}Ti_{1.7}Al_{0.3}(PO_4)_3$), R denotes the measured resistance, and S denotes a cross-sectional area of the measured sample. In the present experiment, the length of the sample was about 2 mm, and the diameter of the measured sample was about 12 mm, and the cross-sectional area of the measured sample was about 113 mm².

The result of the calculation performed by introducing the results of FIG. 2 to the above Equation was about $2.3 \times 10^{-4}$ S/cm.

Example 1

The $Li_{1.3}Ti_{1.7}Al_{0.3}(PO_4)_3$ prepared according to Comparative Example 1 and amorphous $LiPO_3$ were mixed in amounts of about 95 wt % and about 5 wt % respectively, and the mixture was sintered at about 920° C. for about 8 hours.

As a result of the sintering process, a solid electrolyte was obtained. In the solid electrolyte, a solid solution of $Li_{1.3}Ti_{1.7}Al_{0.3}(PO_4)_3$ and $LiPO_3$ was present, that is, a solid solution in which $LiPO_3$ was dissolved in $Li_{1.3}Ti_{1.7}Al_{0.3}(PO_4)_3$. The ion conductivity of the solid electrolyte was about $3.17 \times 10^{-4}$ S/cm at about 22° C.

Example 2

A solid solution was prepared by the same process as in Example 1, except that $Li_{1.3}Ti_{1.7}Al_{0.3}(PO_4)_3$ and amorphous $LiPO_3$ were mixed in amounts of about 80 wt % and about 20 wt % respectively.

The resulting solid electrolyte included a solid solution of $Li_{1.3}Ti_{1.7}Al_{0.3}(PO_4)_3$ and $LiPO_3$, that is, a solid solution in which $LiPO_3$ was dissolved in $Li_{1.3}Ti_{1.7}Al_{0.3}(PO_4)_3$. The ion conductivity of the solid electrolyte was about $3.32 \times 10^{-4}$ S/cm at about 25° C.

Example 3

A solid solution was prepared by the same process as in Example 1, except that $Li_{1.3}Ti_{1.7}Al_{0.3}(PO_4)_3$ and amorphous $LiPO_3$ were mixed in amounts of about 99 wt % and about 1 wt % respectively.

The resulting solid electrolyte included a solid solution of $Li_{1.3}Ti_{1.7}Al_{0.3}(PO_4)_3$ and $LiPO_3$, that is, a solid solution in which $LiPO_3$ was dissolved in $Li_{1.3}Ti_{1.7}Al_{0.3}(PO_4)_3$. The ion conductivity of the solid electrolyte was about $2.51 \times 10^{-4}$ S/cm at about 22° C.

X-ray Diffraction (XRD) Measurements

Figure 3:
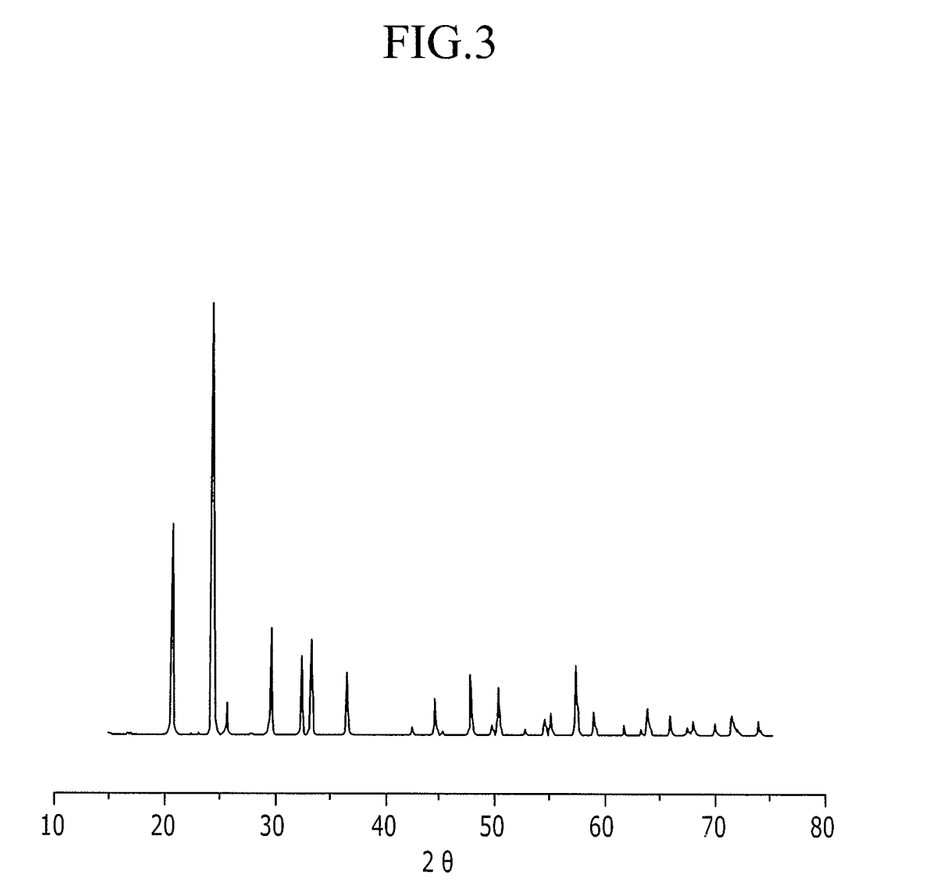
FIG. 3 is a graph of the X-ray diffraction (XRD) analysis results of the solid electrolyte prepared according to Comparative Example 1.
Figure 4:
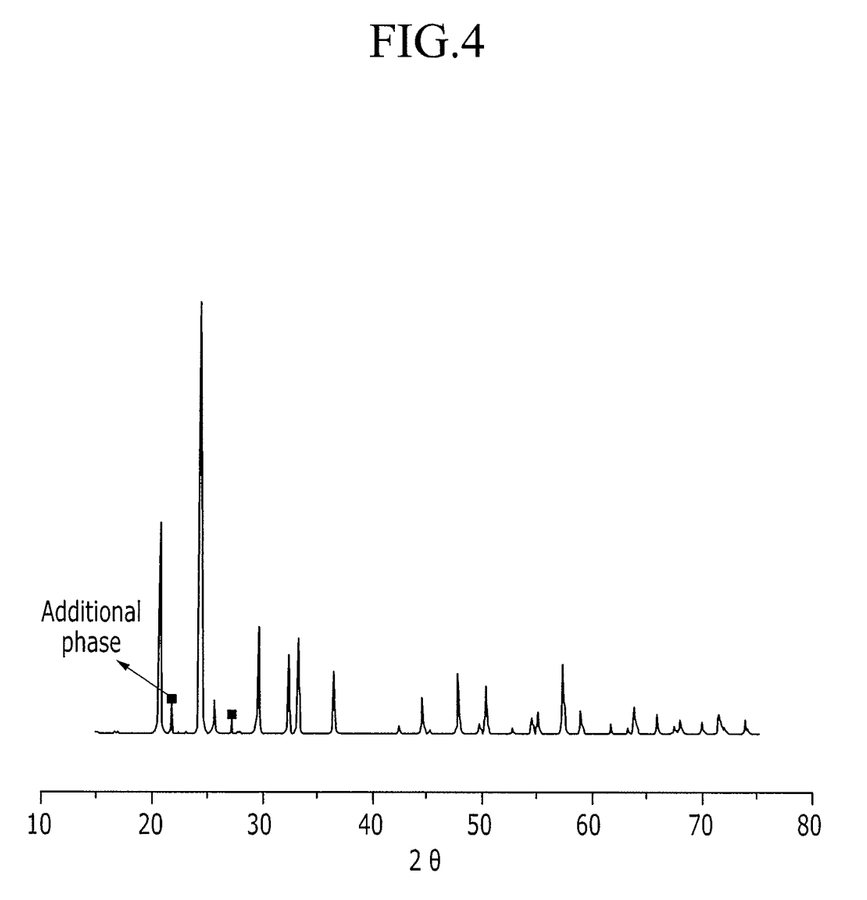
FIG. 4 is a graph of the XRD analysis results of the solid electrolyte prepared according to Example 2.

XRD measurements of the $Li_{1.3}Ti_{1.7}Al_{0.3}(PO_4)_3$ prepared according to Comparative Example 1 and the solid electrolyte of Example 2 were taken using a CuK α ray, and the measurement results are presented in FIGS. 3 (Comparative Example 1) and 4 (Example 2). In FIGS. 3 and 4, peak height represents intensity (a.u.). It may be seen from FIG. 3 that the $Li_{1.3}Ti_{1.7}Al_{0.3}(PO_4)_3$ prepared according to Comparative Example 1 had a NASICON structure. Also, as shown in FIG. 4, an additional phase appeared in the solid electrolyte prepared according to Example 2 as denoted with □, which was different from the results shown in FIG. 3. It may be seen from the results that the solid electrolyte prepared according to Example 2 had a different structure from that of $Li_{1.3}Ti_{1.7}Al_{0.3}(PO_4)_3$.

Measurement of Ion Conductivity

Figure 5:
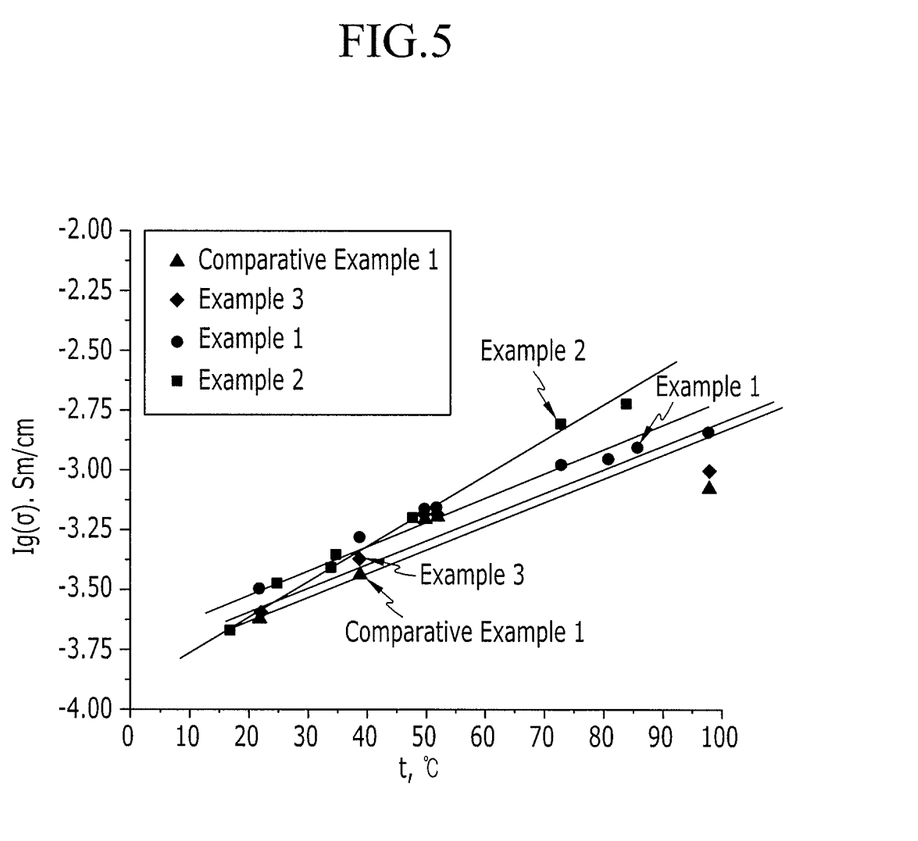
FIG. 5 is a graph comparing the ion conductivity evaluation results of the solid electrolytes prepared according to Examples 1 to 3 and Comparative Example 1.

The ion conductivity characteristics of the solid electrolytes prepared according to Examples 1 to 3 and Comparative Example 1 were measured at a temperature range of about 10° C. to about 100° C., and the results are presented in FIG. 5. As illustrated in FIG. 5, the ion conductivity of the solid electrolyte of Example 1 using $LiPO_3$ in an amount of about 5 wt % was remarkably improved at room temperature and at high temperature, as compared with that of the solid electrolyte of Comparative Example 1, which did not use $LiPO_3$. Also, the ion conductivity of the solid electrolyte of Example 2 using $LiPO_3$ in an amount of about 20 wt % at room temperature was somewhat lower than that of the solid electrolyte of Comparative Example 1, but it improved as the temperature increased. Particularly, the ion conductivity of the solid electrolyte of Example 2 was best at high temperature. Also, in the case of Example 3 using $LiPO_3$ in an amount of about 5 wt %, the ion conductivity was somewhat improved both at room temperature and high temperature, as compared with Comparative Example 1.

It may be seen from the results of FIG. 5 that the solid electrolytes of Examples 1 to 3 have good ion conductivity, and thus, it may be expected that a battery cell having good input and output characteristics may be provided.

While the present invention has been illustrated and described with reference to certain exemplary embodiments, it will be understood by those of ordinary skill in the art that various modifications and alterations may be made without departing from the spirit and scope of the present invention as defined by the appended claims.

What is claimed is:

1. A solid electrolyte for a rechargeable lithium battery, comprising:
   a compound represented by Chemical Formula 1; and
   a glass-based oxide present in the solid electrolyte in an amount of about 1 wt % to about 20 wt %, the glass-based oxide being selected from the group consisting of $LiPO_3$, a composite oxide consisting of $Li_2O$—$B_2O_3$, and combinations thereof:

$$Li_{1+x}Ti_{2-x}Al_xM_y(PO_4)_{3-y} \quad \text{Chemical Formula 1}$$

wherein, x is 0 to 1, M is Si or Ge, and y is 0 or 1.

2. The solid electrolyte of claim 1, wherein the compound represented by Chemical Formula 1 and the glass-based oxide are present in the solid electrolyte in a solid solution in which the glass-based oxide is dissolved in the compound represented by Chemical Formula 1.

3. The solid electrolyte of claim 2, wherein the glass-based oxide is present in the solid electrolyte both in the solid solution and independently of the solid solution.

4. The solid electrolyte of claim 1, wherein the glass-based oxide is present in the solid electrolyte in an amount of about 1 wt % to about 5 wt %.

5. The solid electrolyte of claim 1, wherein the glass-based oxide comprises the composite oxide consisting of $Li_2O$—$B_2O_3$, and a weight ratio of $Li_2O$ to $B_2O_3$ in the composite oxide consisting of $Li_2O$—$B_2O_3$ ranges from about 1:9 to about 9:1.

6. The solid electrolyte of claim 1, wherein the glass-based oxide is amorphous.

7. A rechargeable lithium battery, comprising:
a positive electrode comprising a positive active material;
a negative electrode comprising a negative active material; and
a solid electrolyte comprising a compound represented by Chemical Formula 1, and a glass-based oxide present in the solid electrolyte in an amount of about 1 wt % to about 20 wt %, the glass-based oxide being selected from the group consisting of $LiPO_3$, a composite oxide consisting of $Li_2O$—$B_2O_3$, and combinations thereof:

$$Li_{1+x}Ti_{2-x}Al_xM_y(PO_4)_{3-y} \quad \text{Chemical Formula 1}$$

wherein, x is 0 to 1, M is Si or Ge, and y is 0 to 1.

8. The rechargeable lithium battery of claim 7, wherein the compound represented by Chemical Formula 1 and the glass-based oxide are present in the solid electrolyte in a solid solution in which the glass-based oxide is dissolved in the compound represented by Chemical Formula 1.

9. The rechargeable lithium battery of claim 8, wherein the glass-based oxide is present in the solid electrolyte both in the solid solution and independently of the solid solution.

10. The rechargeable lithium battery of claim 7, wherein the glass-based oxide is present in the solid electrolyte in an amount of about 1 wt % to about 5 wt %.

11. The rechargeable lithium battery of claim 7, wherein the glass-based oxide comprises the composite oxide consisting of $Li_2O$—$B_2O_3$, and a weight ratio of $Li_2O$ to $B_2O_3$ in the composite oxide consisting of $Li_2O$—$B_2O_3$ ranges from about 1:9 to about 9:1.

12. The rechargeable lithium battery of claim 7, wherein the glass-based oxide is amorphous.

* * * * *